Nov. 18, 1958     R. G. IAPADRE     2,860,755
PARKING METER
Filed Oct. 11, 1955     2 Sheets-Sheet 1

Rosario G. Iapadre
INVENTOR.

BY Clarence A. O'Brien
and Harvey B. Jacobson
Attorneys

Nov. 18, 1958

R. G. IAPADRE 2,860,755

PARKING METER

Filed Oct. 11, 1955

Rosario G. Iapadre
INVENTOR.

United States Patent Office 2,860,755
Patented Nov. 18, 1958

2,860,755

PARKING METER

Rosario G. Iapadre, Indiana, Pa.

Application October 11, 1955, Serial No. 539,789

2 Claims. (Cl. 194—83)

This invention relates to parking meters and is a continuation-in-part of the application of Rosario G. Iapadre, Serial No. 406,562, filed January 27, 1954, for Parking Meter.

The primary object of the present invention resides in the provision of a parking meter adapted to provide a specific period allotted for the parking of a vehicle in a particular location upon insertion of a coin or coins of a particular value into the slot provided in the meter.

A further object of the invention resides in the provision of a parking meter which includes means for automatically winding the clockwork mechanism thereof each time the parking meter has a coin deposited therein while also being provided with braking means for automatically stopping the clockwork mechanism after the expiration of the period allotted by the parking meter compatible with the coin or coins deposited in the parking meter.

The construction of this invention features a parking meter which includes a resetting member having a pointer thereon, which resetting member is frictionally actuated through operation of a coin receiving member adapted to align with slots provided in the housing of the parking meter. Means are associated with the coin receiving member for rewinding the clockwork mechanism, and a brake is provided for stopping the clockwork mechanism after the expiration of the selected period.

Still further objects and features of this invention reside in the provision of a coin operated parking meter that is simple in construction and manufacture, capable of being readily utilized to provide adequate means for limiting the length of parking of vehicles on streets, roads and highways while also providing additional revenue to the local government, and which is comparatively inexpensive to install, thereby permitting wide distribution among the traffic enforcement agencies in the various parts of the country.

These, together with the various ancillary objects and features of the invention which will become apparent as the following description proceeds, are attained by this parking meter, a preferred embodiment of which has been illustrated in the accompanying drawing, by way of example only, wherein.

Figure 1:
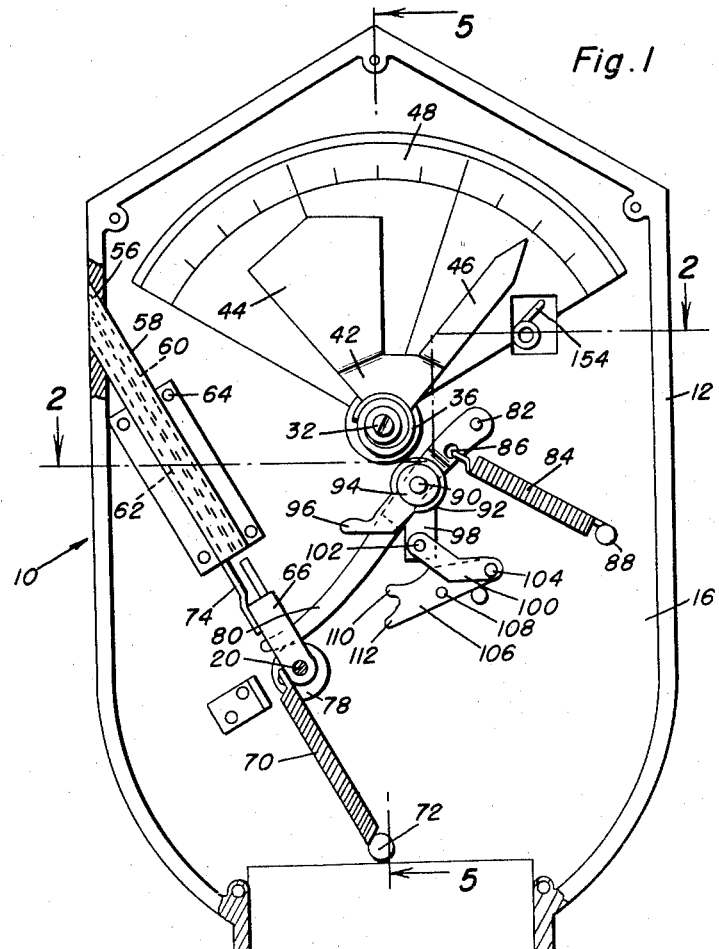
Figure 1 is an elevational view of the parking meter with the face plate removed and with parts thereof being shown in section for detail purposes.
Figure 2:
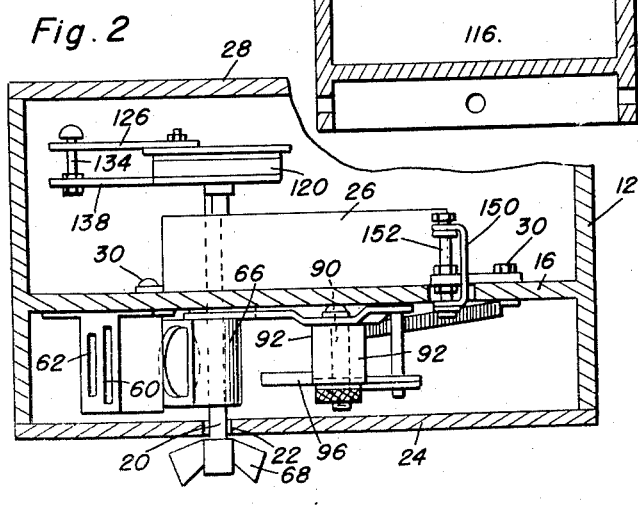
Figure 2 is a horizontal sectional detail view as taken along the planes of lines 2—2 in Figure 1.
Figure 3:
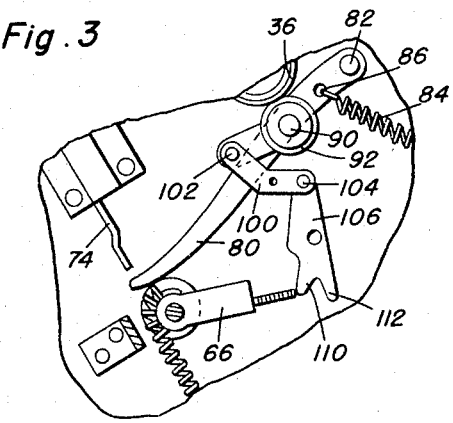
Figure 3 is a partial sectional detail view illustrating the construction of the resetting member actuating mechanism.
Figure 5:
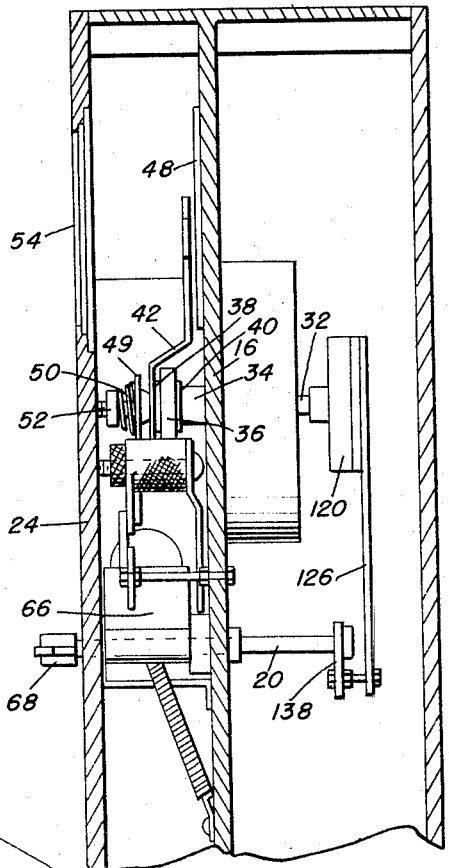
Figure 5 is a vertical sectional view as taken along the plane of line 5—5 in Figure 1.
Figure 4:
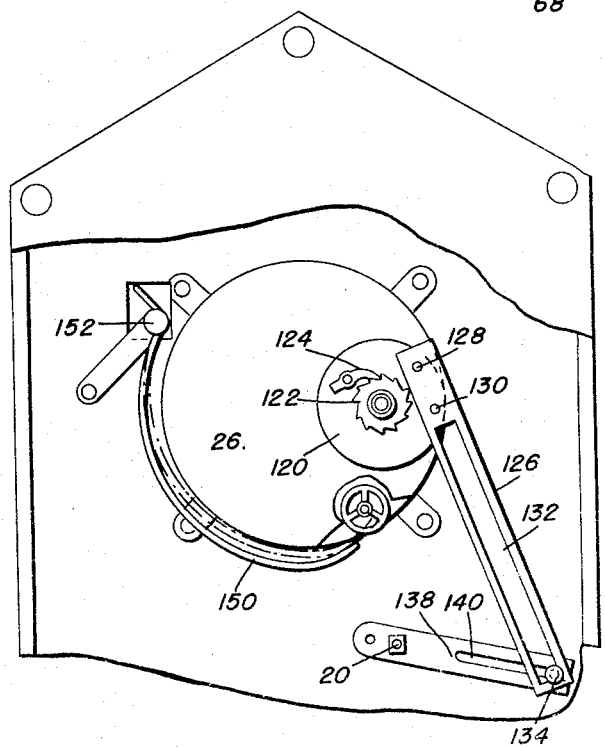
Figure 4 is a rear elevational view with a portion of the rear plate removed illustrating the construction of the brake and of the clockwork rewinding mechanism.

With continuing reference to the accompanying drawings wherein like reference numerals designate similar parts throughout the various views, reference numeral 10 generally designates the parking meter which includes an outer housing 12 forming a head having a neck 14 adapted to be positioned on a supporting standard which is attached to a base on a sidewalk adjacent a street, avenue or other roadway. Within the housing 12 there is a partition wall 16 having an actuating shaft 20 extending therethrough, the actuating shaft 20 also extending through an opening 22 in the front plate 24 of the housing 12, the front plate 24 being detachably secured to the other portions of the housing 12.

Access is had to the clockwork mechanism 26 through the provision of a removable backplate 28. The clockwork mechanism 26 is affixed to the partition wall 16 by means of suitable fasteners as at 30. The clockwork mechanism 26 drives a shaft 32 which extends through the partition wall 16. Mounted on the shaft 32 is a spacer 34 which holds a resilient friction disk 36 in position, suitable washers 38 and 40 being positioned on either side of the resilient friction disk 36. This disk 36 may be formed of rubber or other suitable material. Resiliently engaged by the resilient washer 38 of the friction disk 36 and forming a portion of the resetting member together with the friction disk 36 is an indicating member 42 which includes an indicator 44 as well as a pointer 46. The indicator 44 may be colored red or any other suitable color for indicating the expiration of the period for which the meter has been set to allow parking. The pointer 46 cooperates with a scale 48 on the partition wall 16 for indicating the amount of unexpired time still available. A suitable pressure plate 49 is mounted on the shaft 32 and is urged by a spring 50 to press the indicating member 42 into engagement with the washer 38 and associated friction disk 36. A lock nut 52 is provided for holding the spring 50 in position, the lock nut being threaded on the bifurcated threaded end of the shaft 32. The front plate 24 is, of course, provided with a window 54 so that the scale 48 can be readily perceived. Mounted in the side wall of the housing in a suitable slanted recess 56 provided therefor is a guide 58 having a pair of slots 60 and 62. The coin receiving guide 58 may be held in place by means of suitable fasteners, as at 64, affixed to the partition wall 16 and serve to deliver the coins which may be of different denominations into the coin receiving member 66 which is pivotally mounted on shaft 20. The shaft 20 has an operating handle 68 for rotating the shaft and a spring 70 is terminally attached to the coin receiving member 66 and to a stud, as at 72, on the partition 16 for urging the coin receiving member 66 against stop 74 depending from the guide 58.

Mounted on the shaft 20 is a cam 78 engageable by an arm 80 which is pivotally mounted, as at 82. A spring 84 is terminally secured to a stud 86 on the arm 80 and to a stud 88 mounted on the partition 16 for urging the arm 80 to a lowered position against the action of the cam 78 and into contact with the cam 78.

Mounted on the arm 80 is a shaft 90 which has rotatably mounted thereon a knurled wheel 92. This knurled wheel 92 provides a roughened surface and when the arm 80 is lifted is adapted to engage the friction disk 36 to rotate the friction disk 36 and the associated indicating member 42 upon rotation of the wheel 92. A washer, as at 94, holds a counterweight 96 and the knurled wheel 92 on the shaft 90, the counterweight 96 being secured to the knurled wheel 92, as by a small setscrew, not shown.

Also attached to the knurled wheel 92 in any convenient manner and mounted on the shaft 90 so as to be rotatable with the wheel 92 is a crank arm 98 having a link 100 pivotally attached thereto, as at 102. The link 100 is pivotally attached, as at 104, to an actuating member 106 pivotally mounted on a shaft 108 secured to the partition 16. The actuating member 106 has cam surfaces, as at 110 and 112, adapted to be engaged by coins of one size or the other, respectively, the cam surface 110 being adapted to be engaged by a coin such as a nickel passing through the slot 60 and into the coin receiving member 66 while the cam surface 112 is adapted to be engaged by a coin of the size of a penny passing into the coin receiving member 66. It is to be noted that rotation of the handle 68 will cause the shaft 20 to rotate, which will cause the coin receiving member 66 to be rotated, driving the coin into engagement with the respective cam surfaces 110 and 112. Obviously, if the cam surface 110 is engaged, the member 106 will be rotated a greater extent than if the cam surface 112 were to be engaged, and thus, the nickel will cause the movement of the member 106 and associated linkage, thereby causing the indicator mechanism 42 to move a greater distance than would be caused by the insertion of a penny into the parking meter. After the coin has engaged the cam surfaces 110 and 112, it will be dropped into a receptacle 116 of any suitable shape which may be deposited in the neck portion 14 of the housing 12. Subsequently, the spring 70 will return the coin receiving member 66 to its initial position against the stop 74 after the handle 68 is released. The action of the shaft 20 in its rotation will also cause the clockwork mechanism 26 to be wound. This is because associated with the clockwork mechanism is a winding drum 120 including a pawl 122 and a ratchet 124 for one-way movement thereof. The winding mechanism 112 includes a conventional main spring and this main spring is actuated upon rotation of the shaft due to the fact that the member 126 is also rotated. This member 126 is secured, as by fasteners, as at 128 and 130, in a rigid manner to the winding member 120 and is slotted, as at 132, for reception of a crank pin 134 adjustably mounted in the member 138 which is slotted as at 140 to permit adjustment of the crank pin 134 along its length. The crank member 138 is affixed to the shaft 20.

Associated with the clockwork mechanism 26 is a braking arm 150 which is adapted to engage a moving gear of the clockwork mechanism 26 so as to stop the clockwork mechanism when the brake 150 is actuated. The brake 150 is held in its non-actuated position by gravity, and is pivotally mounted, as at 152, on a suitable shaft or stud which extends through the partition 16. The brake 150 has a projecting portion, as at 154, see Figure 1, which is adapted to be engaged by the pointer 46 and when so engaged, will cause the brake 150 to be raised into engagement with the gear of the clockwork mechanism, thereby stopping the clockwork mechanism. Thus, when the time has expired for which the parking meter has been set to permit parking, the pointer 46 will be rotated into engagement with the portion 154 of the brake 150 to stop the clockwork mechanism and prevent it from running down.

In résumé, the operation of the invention is as follows: A coin is inserted in the guide 54 and from thence, carried to the coin receiver 66. Then, utilizing the handle 68, the shaft 20 is rotated, which causes the arm 80 to be raised due to the action of the arm and the cam 78 causing the wheel 92 to engage the friction disk 36. Rotation of the coin receiver 66 will cause the coin to engage the cam surface 110 and 112 of the member 106 and thus cause the wheel 92 to be rotated through the use of the linkage 100 between the crank 98 and the member 106. The rotation of the wheel 92 is transmitted to the friction wheel 36 and to the indicator 42, thus moving the indicator the desired amount. At the same time, rewind mechanism 120 is actuated to wind the clock. After a passage of the time for permissive parking, the pointer will be engaged with the portion 154 of the brake 150 due to the rotation of the shaft 32 by the clockwork mechanism 26. This will raise the indicator 44 into a position to indicate overtime parking.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A parking meter comprising a head enclosing a clockwork mechanism, a timing scale on said head, an indicating member having a pointer, said pointer cooperating with said timing scale, a coin chute mounted in said head, a coin receiver for receiving a coin from said coin chute, said coin receiver being pivotally mounted in said head, said indicating member being actuated by said clockwork mechanism, said indicating member being mounted on a shaft, a resilient disk on said shaft frictionally engaging said indicating member, a pivotally mounted arm having an actuating wheel rotatably mounted thereon, said wheel being engageable with said disk, means associated with said coin receiver for pivoting said arm to engage said wheel with said resilient disk, and means connected to said wheel for rotating said wheel, said last recited means being engageable by a coin carried by said coin receiver whereby pivoting of said coin receiver will rotate said wheel.

2. A parking meter comprising a head enclosing a clockwork mechanism, a timing scale on said head, an indicating member having a pointer, said pointer cooperating with said timing scale, a coin chute mounted in said head, a coin receiver for receiving a coin from said coin chute, said coin receiver being pivotally mounted in said head, said indicating member being actuated by said clockwork mechanism, said indicating member being mounted on a shaft, a resilient disk on said shaft frictionally engaging said indicating member, a pivotally mounted arm having an actuating wheel rotatably mounted thereon, said wheel being engageable with said disk, means associated with said coin receiver for pivoting said arm to engage said wheel with said resilient disk, means connected to said wheel for rotating said wheel, said last recited means being engageable by a coin carried by said coin receiver whereby pivoting of said coin receiver will rotate said wheel, a brake mechanism for stopping said clockwork mechanism, said brake mechanism being engageable by and actuated by said pointer, and means associated with said coin receiver for rewinding said clockwork mechanism.

References Cited in the file of this patent
UNITED STATES PATENTS

| | | |
|---|---|---|
| 2,256,398 | Lucia | Sept. 16, 1941 |
| 2,307,999 | Eidmann | Jan. 12, 1943 |